United States Patent
Rud et al.

(10) Patent No.: US 12,055,443 B2
(45) Date of Patent: Aug. 6, 2024

(54) RTD DEGRADATION DETECTION

(71) Applicant: Rosemount Inc., Shakopee, MN (US)

(72) Inventors: Jason H. Rud, Chanhassen, MN (US); Kevin C. Kurtzman, Plymouth, MN (US)

(73) Assignee: Rosemount Inc., Shakopee, MN (US)

( * ) Notice: Subject to any disclaimer, the term of this patent is extended or adjusted under 35 U.S.C. 154(b) by 121 days.

(21) Appl. No.: 16/906,272

(22) Filed: Jun. 19, 2020

(65) Prior Publication Data
US 2021/0396590 A1    Dec. 23, 2021

(51) Int. Cl.
*G01K 1/024* (2021.01)
*G01K 1/02* (2021.01)
*G01K 7/16* (2006.01)

(52) U.S. Cl.
CPC ............. *G01K 1/024* (2013.01); *G01K 1/026* (2013.01); *G01K 7/16* (2013.01)

(58) Field of Classification Search
CPC .......... G01K 1/024; G01K 1/026; G01K 7/16; G01K 7/18; G01K 15/007; G01K 13/02
See application file for complete search history.

(56) References Cited

U.S. PATENT DOCUMENTS

| | | | |
|---|---|---|---|
| 6,356,191 B1 | 3/2002 | Kirkpatrick et al. | |
| 6,369,563 B1 * | 4/2002 | Krahe | G01D 5/485 324/207.13 |

(Continued)

FOREIGN PATENT DOCUMENTS

| | | | | |
|---|---|---|---|---|
| DE | 112014000282 B4 * | 10/2017 | ............... | G01K 1/08 |
| JP | H02273902 A | 11/1990 | | |

(Continued)

OTHER PUBLICATIONS

International Search Report and Written Opinion dated Sep. 24, 202, for International Patent Application No. PCT/US2021/036175, 14 pages.

(Continued)

*Primary Examiner* — Rufus C Point
(74) *Attorney, Agent, or Firm* — Christopher R. Christenson; Kelly, Holt & Christenson, P.L.L.C.

(57) ABSTRACT

A process fluid temperature transmitter includes a plurality of terminals, an excitation source, a measurement device, and a controller. The plurality of terminals is couplable to an RTD. The excitation source is operably coupled to the plurality of terminals and is configured to apply an excitation signal to the RTD. The measurement device is coupled to the plurality of terminals and is configured to measure a response of the RTD to the applied excitation signal. The controller is coupled to the excitation source and the measurement device. The controller is configured to perform an RTD resistance measurement by causing the excitation source to apply the excitation signal to the RTD and to cause (Continued)

the measurement device to measure the response of the RTD while the excitation signal is applied to the RTD. The controller is also configured to perform an RTD diagnostic by causing the excitation source to change application of the excitation signal and causing the measurement device to measure an RTD response to the changed excitation signal.

18 Claims, 6 Drawing Sheets

(56) References Cited

U.S. PATENT DOCUMENTS

| | | | | |
|---|---|---|---|---|
| 6,473,710 | B1* | 10/2002 | Eryurek | G08C 19/02 |
| | | | | 702/182 |
| 6,754,601 | B1* | 6/2004 | Eryurek | G01K 15/00 |
| | | | | 324/649 |
| 11,327,121 | B2* | 5/2022 | Pressman | G05B 19/042 |
| 2009/0141771 | A1* | 6/2009 | Owen | G01K 1/14 |
| | | | | 374/E7.003 |
| 2010/0177800 | A1* | 7/2010 | Rud | G01K 7/20 |
| | | | | 374/E7.018 |
| 2014/0056329 | A1* | 2/2014 | Alley | G01K 15/007 |
| | | | | 374/185 |
| 2014/0241399 | A1 | 8/2014 | Rud | |
| 2014/0355650 | A1* | 12/2014 | Hong | G01K 7/22 |
| | | | | 374/170 |
| 2017/0322089 | A1* | 11/2017 | Kumar Beeram | G01K 15/007 |
| 2020/0319259 | A1* | 10/2020 | Pressman | G05B 19/042 |

FOREIGN PATENT DOCUMENTS

| | | |
|---|---|---|
| JP | 2008151601 A | 7/2008 |
| KR | 20110131860 A | 12/2011 |

OTHER PUBLICATIONS

International Preliminary Report on Patentability for PCT Application No. PCT/US2021/036175, Dated Dec. 29, 2022, 9 pages.

First Office Action for Japanese Patent Application No. 2022-577471, Dated Mar. 26, 2024, 14 pages including English Translation.

Supplementary Search Report for European Patent Application No. 21826869.6, dated May 24, 2024, 7 pages.

* cited by examiner

RTD DEGRADATION DETECTION

BACKGROUND

The process industry employs process variable transmitters to monitor process variables associated with substances such as solids, slurries, liquids, vapors, and gasses in chemical, pulp, petroleum, pharmaceutical, food and other fluid processing plants. Process variables include pressure, temperature, flow, level, turbidity, density, concentration, chemical composition and other properties. A process fluid temperature transmitter provides an output related to a sensed process fluid temperature. The process fluid temperature transmitter output can be communicated over a process control loop or segment to a control room, or the output can be communicated to another process device such that the process can be monitored and controlled. In order to monitor a process fluid temperature, the transmitter includes, or is coupled to, a temperature sensor, such as a resistance temperature device (RTD).

An RTD changes its resistance in response to change in temperature. By measuring the resistance of an RTD, temperature can be calculated. Such resistance measurement is generally accomplished by passing a known current through the RTD, and measuring the associated voltage developed across the RTD. The RTD elements are typically constructed from a metal element, such as platinum, placed around or within a housing formed of an insulative material, such as ceramic. RTDs can be manufactured by winding the metal element about an insulating core or bobbin. Additionally, RTDs are also known where the element is etched or deposited upon an insulating substrate. Sometimes, cement or glass is used to provide an environmental seal at ends of the RTD assembly and also to provide strain relief for wires that couple to the RTD assembly. The surrounding materials are generally used to protect the wire and are also intended to be electrically isolating.

As RTDs are required to be used in applications at higher and higher temperatures, additional sources of error can cause errors in the output of such RTDs. As process fluid temperature measurement has become more accurate, there is in increasing need to identify and compensate for smaller and smaller sources of error such as those that can develop in high-temperature applications. Such error reduction provides more accurate temperature measurements, resulting in more precise process control and the opportunity for increased efficiency and safety.

SUMMARY

A process fluid temperature transmitter includes a plurality of terminals, an excitation source, a measurement device, and a controller. The plurality of terminals is couplable to an RTD. The excitation source is operably coupled to the plurality of terminals and is configured to apply an excitation signal to the RTD. The measurement device is coupled to the plurality of terminals and is configured to measure a response of the RTD to the applied excitation signal. The controller is coupled to the excitation source and the measurement device. The controller is configured to perform an RTD resistance measurement by applying the excitation signal to the RTD and to cause the measurement device to measure the response of the RTD while the excitation signal is applied to the RTD. The controller is also configured to perform an RTD diagnostic by causing the excitation source to change the excitation signal and causing the measurement device to measure an RTD response to the changed excitation signal.

DETAILED DESCRIPTION OF ILLUSTRATIVE EMBODIMENTS

One source of error that has been observed in high-temperature RTD applications is believed to be related to a change in the insulative materials used to construct such RTDs. For example, it is believed that common construction materials used for isolation within RTDs can become conductive, or at least partially so, when exposed to elevated temperatures. Errors that can develop once such isolation materials break down are currently undetectable and unknown to the end user. Embodiments described herein generally leverage a measurement scheme that can provide detection and indication as well as a method for compensating for this effect. While embodiments described herein will generally be described with respect to a process fluid temperature transmitter, it is noted that embodiments of the present invention can be practiced with respect to any high temperature RTD in any application.

There is an increasing need for using RTDs at high temperatures and in some cases temperatures at or above 600° Celsius. As set forth above, some of the materials used for building such an RTD sensor can become electrically conductive, or at least partially so, at elevated temperatures and can begin to develop energy storage characteristics making them difficult to measure accurately. This behavior can also develop below 600° Celsius if the materials used in the construction of the RTD are contaminated. This can produce a heretofore undetectable measurement error if the RTD is not calibrated at such elevated temperature. In most cases, extreme temperatures are not used for RTD calibration.

If an RTD experiences energy storage behavior and an excitation current is applied or removed, there will be an excessive, or otherwise extended, period of time that will be required for charging or discharging the RTD. This characteristic can be modeled as a first order time constant using a resistor and capacitor network (in reality this system is more complex, but the basic relationship still applies). As temperature increases, the time constant increases which results in an induced voltage that has not fully settled out in the typical time allowed for measurement. This problem is exacerbated if a dual RTD element sensor is used and there is a significant capacitance between the two elements. When one of the RTD elements is measured, the capacitance between the elements is essentially charged up. When the measurement is switched over to the other sensor, the voltage polarity held on the "capacitor" is flipped. This causes a negative voltage to be present on the second RTD element and increases the charge time of the capacitance. If the settling time delay in the measurement is not set long enough, then each RTD element measurement would have an impact on the other sensor. The settling time delay is defined herein as the time required for the voltage across an RTD to reach an acceptable state after application of excitation current to the RTD.

Figure 1:
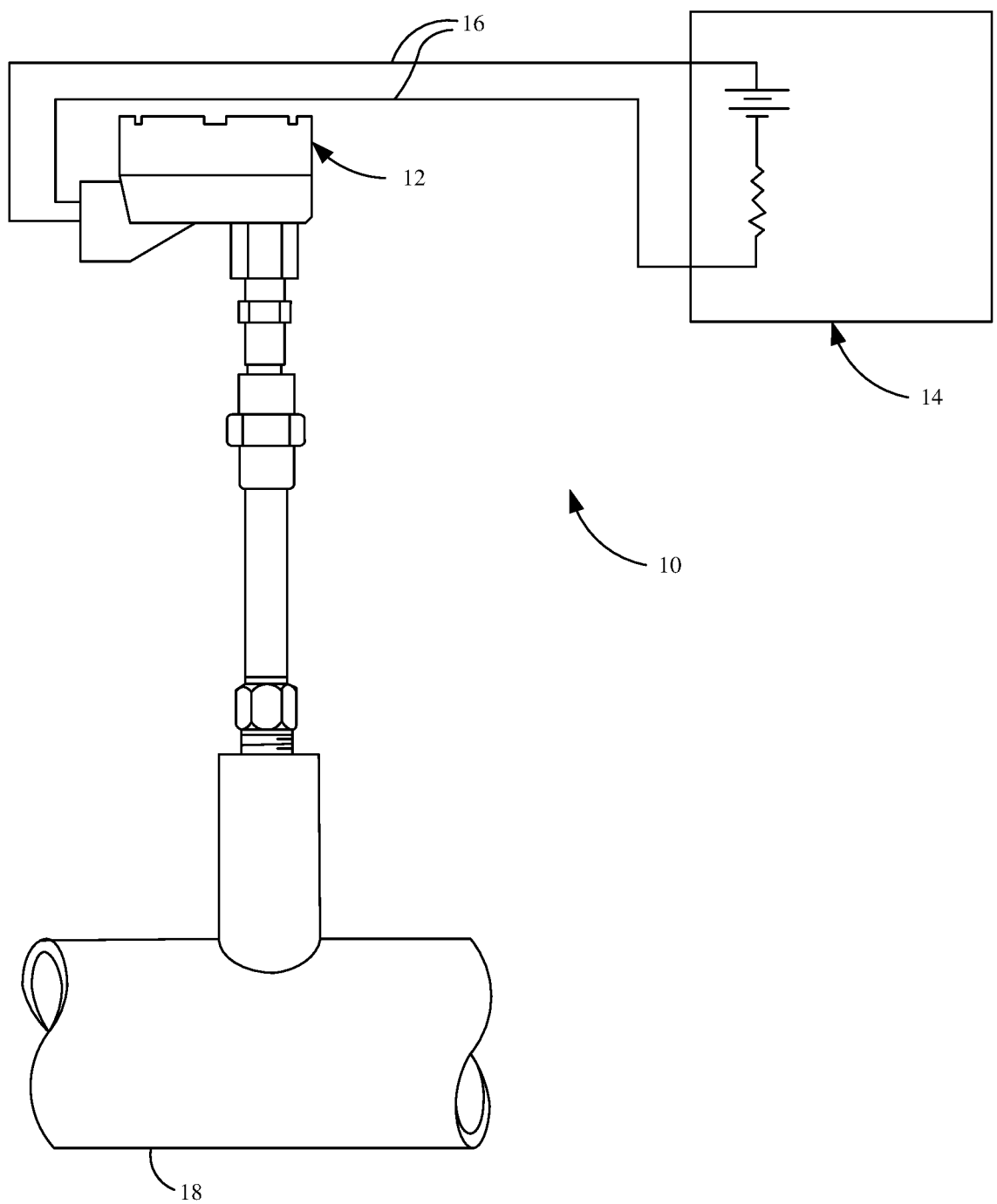
FIG. 1 is a diagrammatic view of an environment of a process fluid temperature transmitter in which embodiments of the present invention are particularly applicable.

FIG. 1 is a diagrammatic view of an environment of a process fluid temperature transmitter in which embodiments of the present invention are particularly applicable. FIG. 1 illustrates process control system 10 including process fluid temperature transmitter 12 electrically coupled to control room 14 (modeled as a voltage source and resistance) over a process control loop 16. One aspect of embodiments of the present invention is the removal of errors caused by changes in the insulative properties of the materials of the RTD at high temperatures. The process temperature output value is related to the measured resistance of the RTD and compensated for energy storage behavior within the RTD, by circuitry within transmitter 12.

Figure 2:
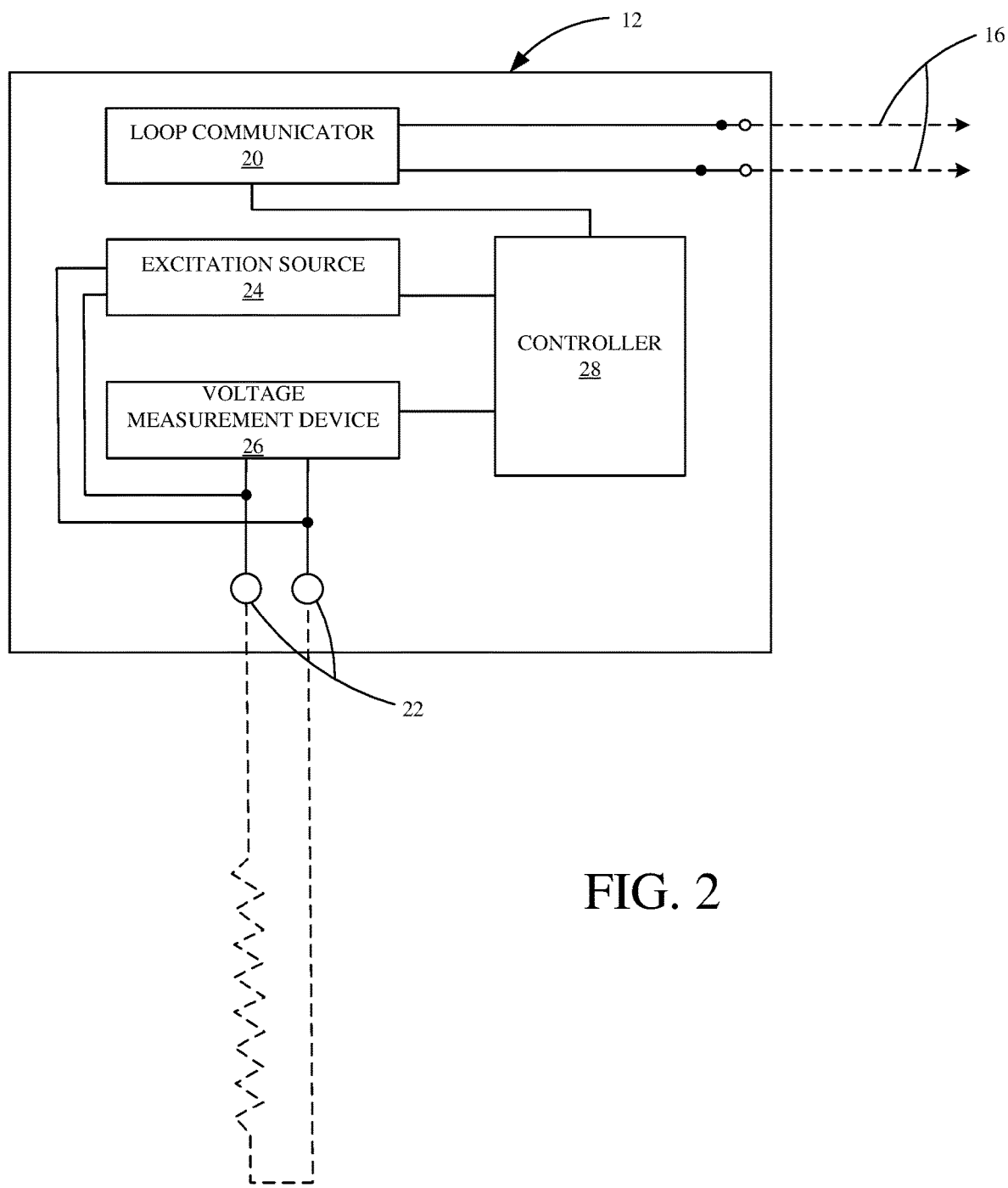
FIG. 2 is a system block diagram of a process fluid temperature transmitter in accordance with an embodiment of the present invention.

FIG. 2 is a system block diagram of process fluid transmitter 12 in accordance with an embodiment of the invention. Process fluid temperature transmitter 12 includes loop communicator 20, a plurality of terminals 22, excitation source 24, measurement device 26, and controller 28.

Loop communicator 20 is couplable to process control loop 16 (shown in phantom) and is adapted to communicate over process control loop 16. Process control loop 16 is any physical configuration that is capable of passing signals related to process information. For example, process control loop 16 can be a two-wire, 4-20 mA process control loop. In some process control loop embodiments, the energization levels are low enough to comply with the intrinsic safety specification as set forth in the Factory Mutual Approval Standard entitled "Intrinsically Safe Apparatus and Associated Apparatus for Use in Class I, II, and III, Division 1 Hazardous (Classified) Locations," Class Number 3610, published October 1988. Some process variable transmitters can operate on such low energy levels that they can receive all required electrical power from a 4-20 mA process control loop.

Loop communicator 20 can include a 4-20 mA communication section for analog communication. For digital signals, communicator 20 can include a Highway Addressable Remote Transducer (HART®) communication section, a FOUNDATION™ Fieldbus communication section, or any other appropriate section. In accordance with one embodiment, loop communicator 20 is configured to communicate in accordance with a wireless process industry standard communication protocol such as that in accordance with IEC 62591 (WirelessHART). Thus, loop communicator 20 is adapted for bi-directional communication over process control loop 16 (wired or wireless) according to one or more selected protocols in a known manner.

FIG. 2 shows a pair of terminals 22 coupled to a resistance temperature device, such as RTD 30 (shown in phantom).

Although FIG. 2 shows a pair of terminals 22, any appropriate number of terminals can be used to couple to RTD 30. RTD 30 can be separate from transmitter 12 (as shown) or included within transmitter 12.

Excitation source 24 is operably coupled to terminals 22 and is adapted to generate an excitation signal, such as a current, through the plurality of terminals. Passing a known excitation signal through an unknown resistance causes an associated response from RTD's resistance that is indicative of the temperature to which the RTD is exposed. Excitation source 24 is shown in block form and can be any suitable excitation source, such as a current source or voltage source that provides a suitable signal output. In one embodiment, excitation source 24 is a semiconductor current source.

Measurement device 26 is coupled to terminals 22 and is adapted to measure and provide, to controller 28, a response, such as a voltage value, indicative of a response of the RTD to the excitation signal across terminals 22. Measurement device 26 can include an analog-to-digital converter, or any other appropriate device capable of measuring the voltage across terminals 22. If such measurement is performed while excitation source 24 is passing the excitation current through RTD 30, then the measured response will be related to the resistance of RTD 30, and thus the process fluid temperature.

Controller 28 is coupled to measurement device 26, excitation source 24, and loop communicator 20. Controller 28 is configured to control excitation source 24 to apply an excitation signal through or across the RTD via terminals 22 and to cause measurement device 26 to measure a response through or across terminals 22 while the excitation signal is applied. Controller 28 is adapted to determine a process temperature output value based on the RTD's resistance determined while the excitation signal is applied.

In accordance with an embodiment of the present invention, controller 28 is also configured to perform an RTD energy storage diagnostic to determine a degree to which the RTD stores energy and to compensate the process temperature output based on energy storage behavior of the RTD. Controller 28 is configured to provide a compensated process temperature output value to loop communicator 20 for communication over process control loop 16.

Controller 28 can be a programmable gate array, microprocessor, or any other suitable device that can reduce or eliminate the effects of the high-temperature induced errors described herein. Such error reduction can be performed mathematically or with appropriate circuitry or through a combination of both.

Figure 3A:
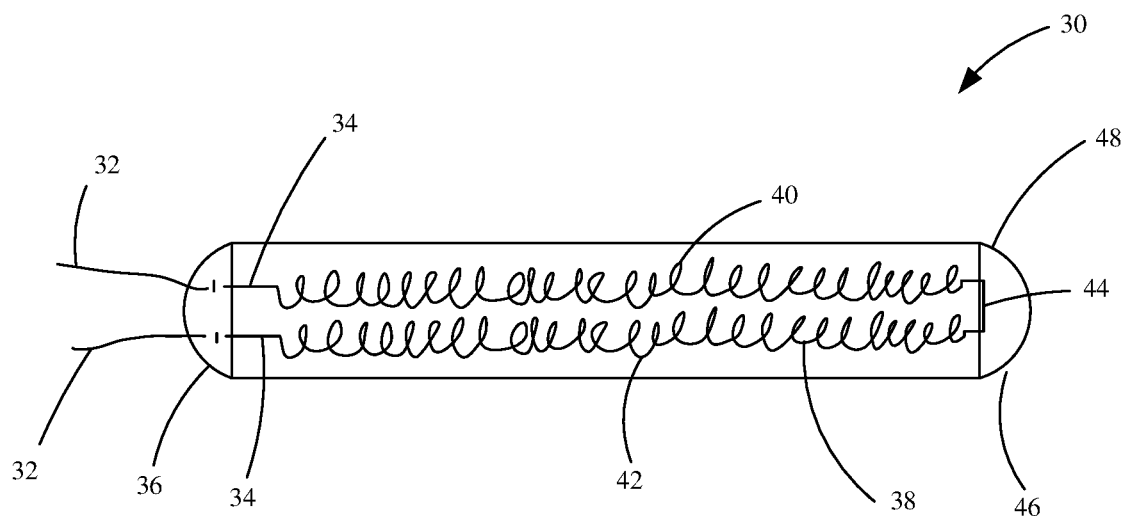
FIG. 3A is a diagrammatic view of an RTD with which embodiments of the present invention are particularly applicable.

FIG. 3A is a diagrammatic view of a an RTD with which embodiments of the present invention are particularly applicable. RTD 30 is shown with a pair of connection leads 32 that are couplable to a measurement device, such as measurement device 26 (described with respect to FIG. 2). Leads 32 connect to RTD conductors 34 within cold end seal 36. Cold end seal 36 may be formed of cement or glass in order to provide an environmental seal at the ends of the assembly and provide strain relief for wires 32. In one embodiment, RTD 30 includes a pair of platinum coils 38, 40, disposed within ceramic body 42. Each of coils 38, 40, is formed of a wire that is wound about an insulative core. This insulative core can be formed of any suitable high-temperature material, such as a ceramic or glass. While the embodiment described with respect to FIG. 3A employs platinum wires, embodiments of the present invention can be practiced with any suitable material that has electrical resistance that changes relative to or with temperature, such as nickel or copper. As shown in FIG. 3A, coils 38 and 40 are electrically coupled together via interconnect 44 disposed proximate hot end 46 within hot end seal 48. Hot end seal 48, like cold end seal 36, can be formed of any suitable material, such as glass or cement in order to provide a high-temperature seal and protect interconnect 44. Accordingly, in the embodiment illustrated in FIG. 3A, coils 38, 40 are electrically coupled in series with one another.

Figure 3B:
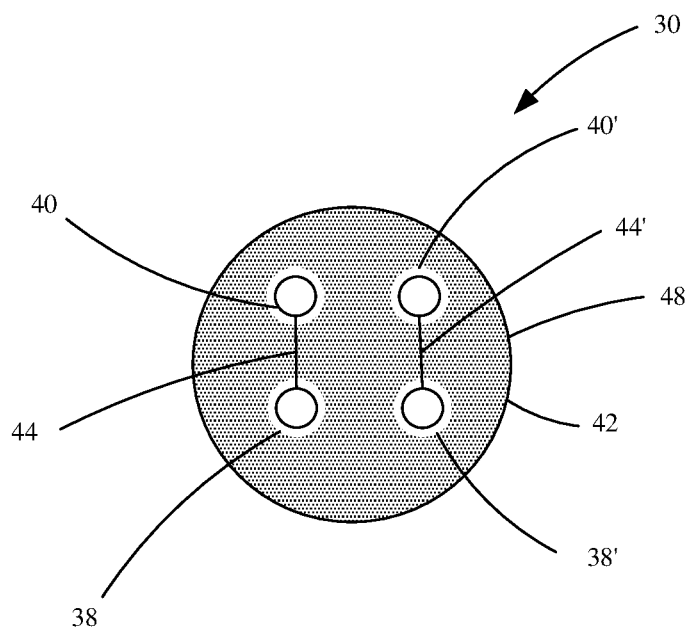
FIG. 3B is a side view of an end of the RTD shown in FIG. 3A.

FIG. 3B is a side elevation view of hot end 48 of RTD 30. FIG. 3B shows that coils 38 and 40 as well as interconnect 44 provide one element of a dual-element RTD assembly. As shown in FIG. 3B, a second set of coils 38' and 40' are also provided in ceramic body 42 and connected in series with one another via interconnect 44'.

Measurement devices, such as a bench top digital multimeter, or the temperature transmitter described with respect to FIGS. 1 and 2, have different measurement capabilities. Any of these measurement devices will use an excitation current to monitor or otherwise measure a voltage drop across the RTD. A process fluid temperature transmitter, such as that described above, will typically turn on and off an excitation signal periodically to perform sensor checks, switch channels for measurement, and/or provide compensation for other sources of errors (such as EMF—small thermocouples that develop at the junctions of dissimilar metals within the RTD).

Figure 4:
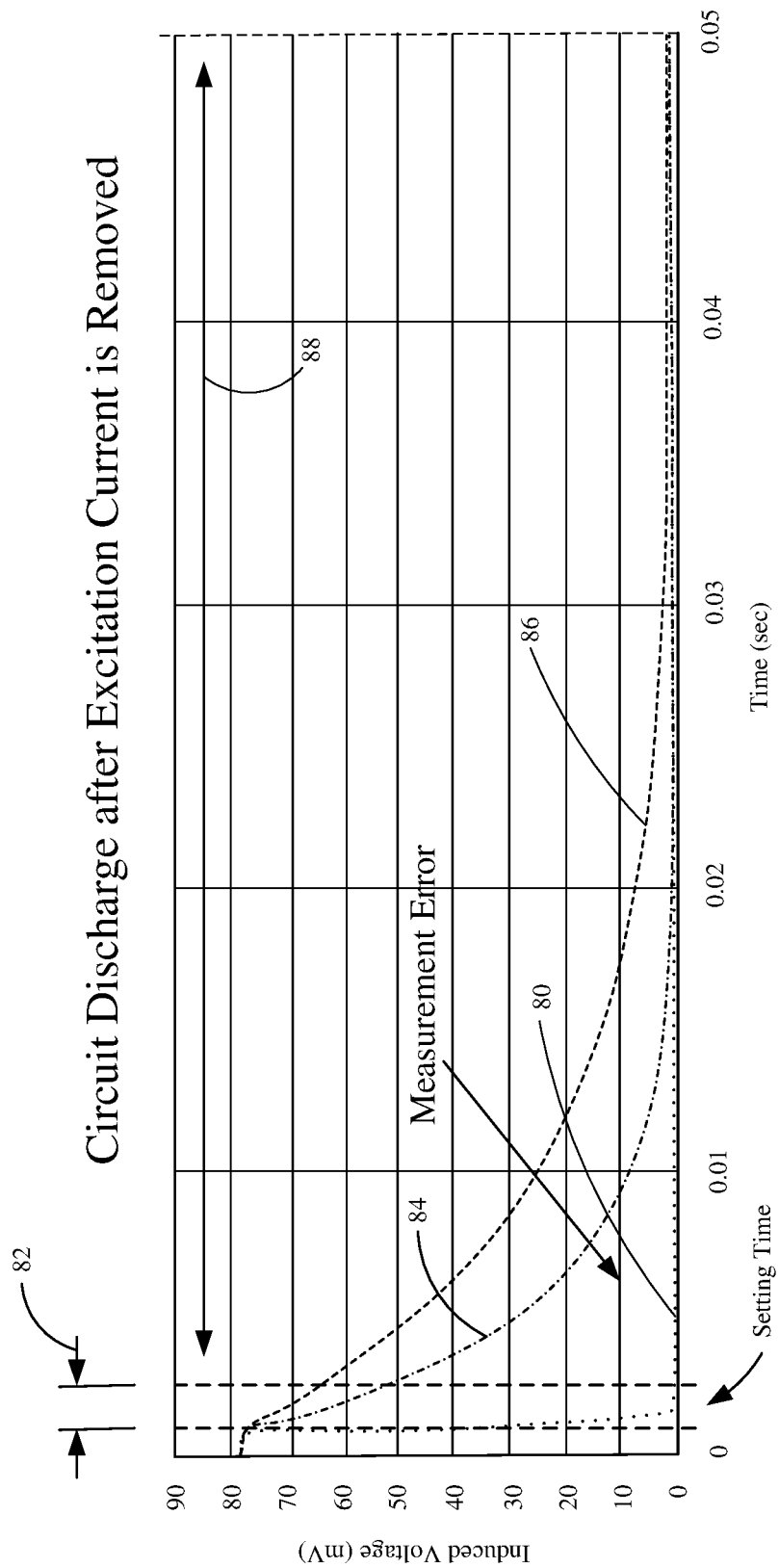
FIG. 4 is a chart illustrating induced voltage varying with time for an RTD assembly at three different operating temperatures (normal operating temperature, 400° C., and 600° C.

FIG. 4 is a chart illustrating measurement error of an induced voltage of a high temperature RTD assembly at different operating temperatures. Note, the different temperatures are not specific temperatures, but are shown to illustrate three relatively different temperatures. At a normal operating temperature (shown at line 80), the induced voltage drops to zero within settling time 82. However, at operating temperature 84 (normal operating temperature+400° Celsius), the induced voltage only drops to approximately 50 millivolts at the end of settling time 82. Further, at operating temperature 86 (normal operating temperature+600° Celsius), the induced voltage only drops to approximately 65 millivolts within settling time 82. If the settling time delay in the measurement for measurement conversion time 88 is not long enough, then each sensor measurement would have an impact on the other sensor measurement.

In accordance with an embodiment of the present invention, controller 28, through software, hardware, or a combination of both, is configured to obtain multiple voltage measurements across the RTD once excitation current is removed.

Figure 5:
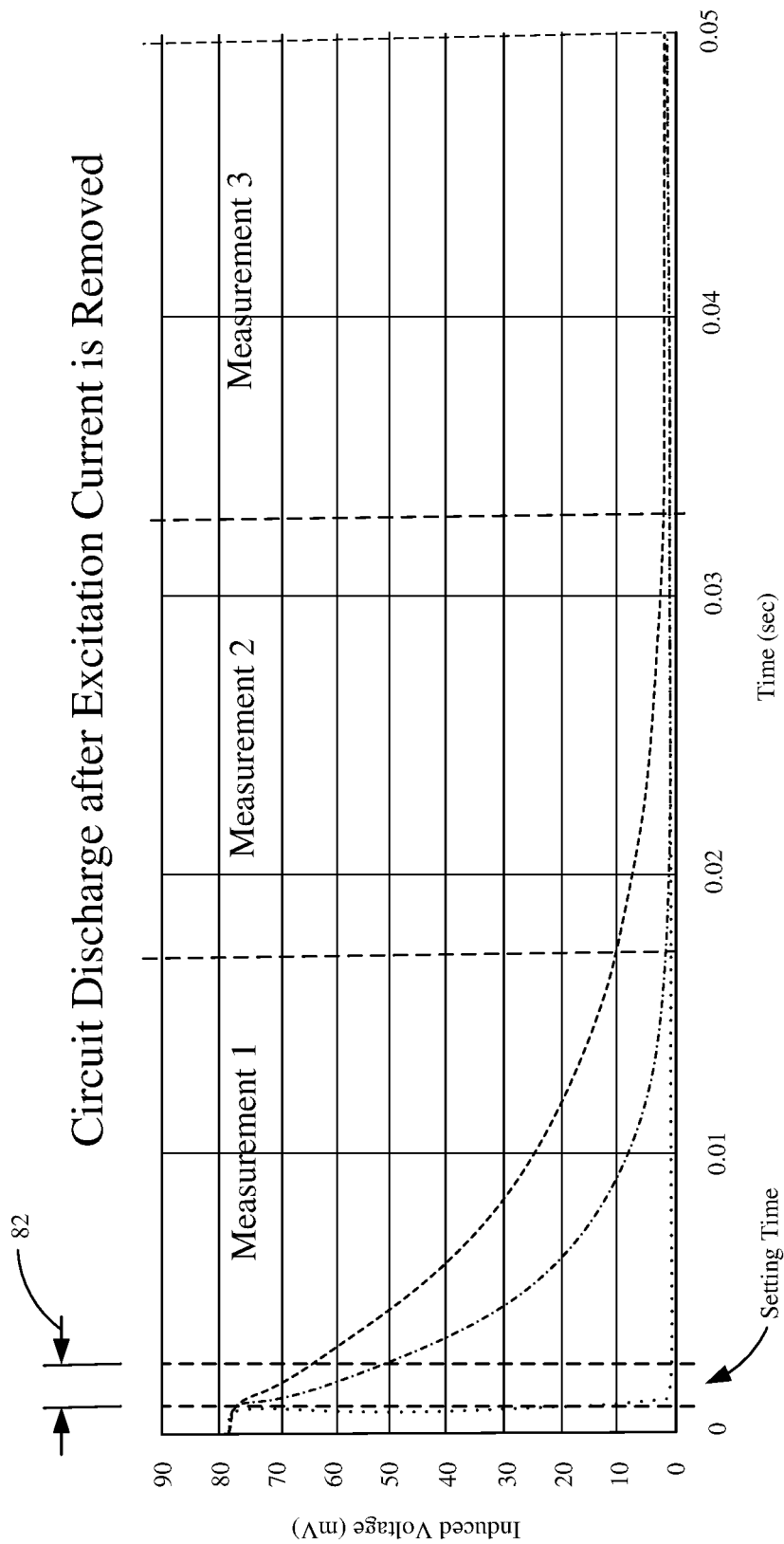
FIG. 5 is a chart illustrating the acquisition of a plurality of successive measurements occurring after the removal of an excitation signal for an RTD in accordance with an embodiment of the present invention.

FIG. 5 is a chart illustrating the acquisition of measurements 1, 2, and 3, occurring after the removal of an excitation current for RTD 30. As shown in FIG. 5, the excitation current is removed at the beginning of settling time 82. By taking multiple measurements of the sensor once the excitation current is removed, the trend of the discharge rate can be determined in order to indicate how degraded the sensor is and how much settling time is required to provide a valid measurement. If the degradation is significant, controller 28 can also provide an indication to the end user.

As shown in FIG. 5, there are three measurement regions highlighted beyond a typical settling time 82. Each one of these segments produces an average measurement over that time span. As can be seen, measurement 1 produces an average output that is greater than measurement 2. Likewise, measurement 2 will be greater than measurement 3. Each line represents a first order time constant that grows as the temperature increases. Normal functioning RTDs' electrical characteristics will not exceed the settling time, used by a standard temperature measurement transmitter. By comparing the values of these measurements, a trend can be identified and used to predict how degraded the RTD is, and to allow the temperature transmitter to adjust settling time 82 to compensate for the excessive time constant. This compensation allows the user to maintain accurate measurements and be notified if maintenance is required. It is useful to note that "time constant" is typically described with respect to temperature sensors as measuring a time for the sensor to achieve an output that matches a temperature to which it is coupled. Such a time constant is thus obtained while an excitation current is applied to the sensor. In contrast, the embodiment described with respect to FIGS. 4 and 5 measures an electrical discharge time constant of an RTD after removal of an excitation current. As can be seen, the three measurements shown in FIG. 5 occur in relatively quick succession with measurement 1 ending at approximately 0.017 seconds at the beginning of measurement 2 which spans from approximately 0.017 seconds to 0.033 seconds. Finally, measurement 3 takes from 0.033 seconds to 0.050 seconds. Note, the illustrated times for measurements are exemplary only and changes can be made in timing and the number of successive measurements in accordance with the various embodiments described herein.

As can be seen, if all measurements are equal, such as would be the case for a non-degraded temperature sensor, then controller 28 can determine that no error is present and that no adjustment to settling time 82 is required. However, as the multiple measurements begin to register different values, controller 28, can detect degradation of the RTD and provide an indication of such degradation. Additionally, controller 28 can extend settling time 82 in order to find a value for settling time 82 that results in a difference between measurements 1, 2, and 3, that is acceptable, or below a pre-selected threshold. When the time constant exceeds expected settling time 82, by a set threshold, controller 82 would, in one embodiment, generate an indication indicative of an inaccuracy that is outside of the accuracy specification of the temperature transmitter.

As set forth above, controller 28 can adjust the settling time in response to detection of sensor degradation. In one embodiment, the settling time correction is adjusted by removing excitation current from the RTD. This should ideally drive the measured voltage to zero. With inherent offsets in the temperature transmitter managed properly, the remaining measured voltage is determined to be error. The errors identified between measurements 1, 2, and 3 can be used to recalculate a new time constant that may have changed with the degrading RTD. The new time constant Tau may be calculated as follows:

$$Tau = \frac{Tmeas}{LN\left(\frac{Verror1}{Verror2}\right)}$$

This new time constant value can be used to recalculate a new settling time that meets the desired error threshold in order to continue to provide accurate measurements. The new settling time Ts may be calculated as follows:

$$Ts = -Tau * LN\left(\frac{-Meas\_Pcnt * Tmeas}{Tau * \left(e^{\frac{-Tmeas}{Tau}} - 1\right)}\right)$$

In the above equations, Tau is the time constant, Tmeas is the measurement time, Ts is the settling time, Verror1 is the error from measurement 1, Verror2 is the error from measurement 2, and Meas_Pcnt is the percent of allowable error in the measurement.

For example, as shown in FIG. 5, there are three measurements provided in the plot. Measurement 1 is the first in the sequence counter, measurement 2 is the second, and so on.

Figure 6:
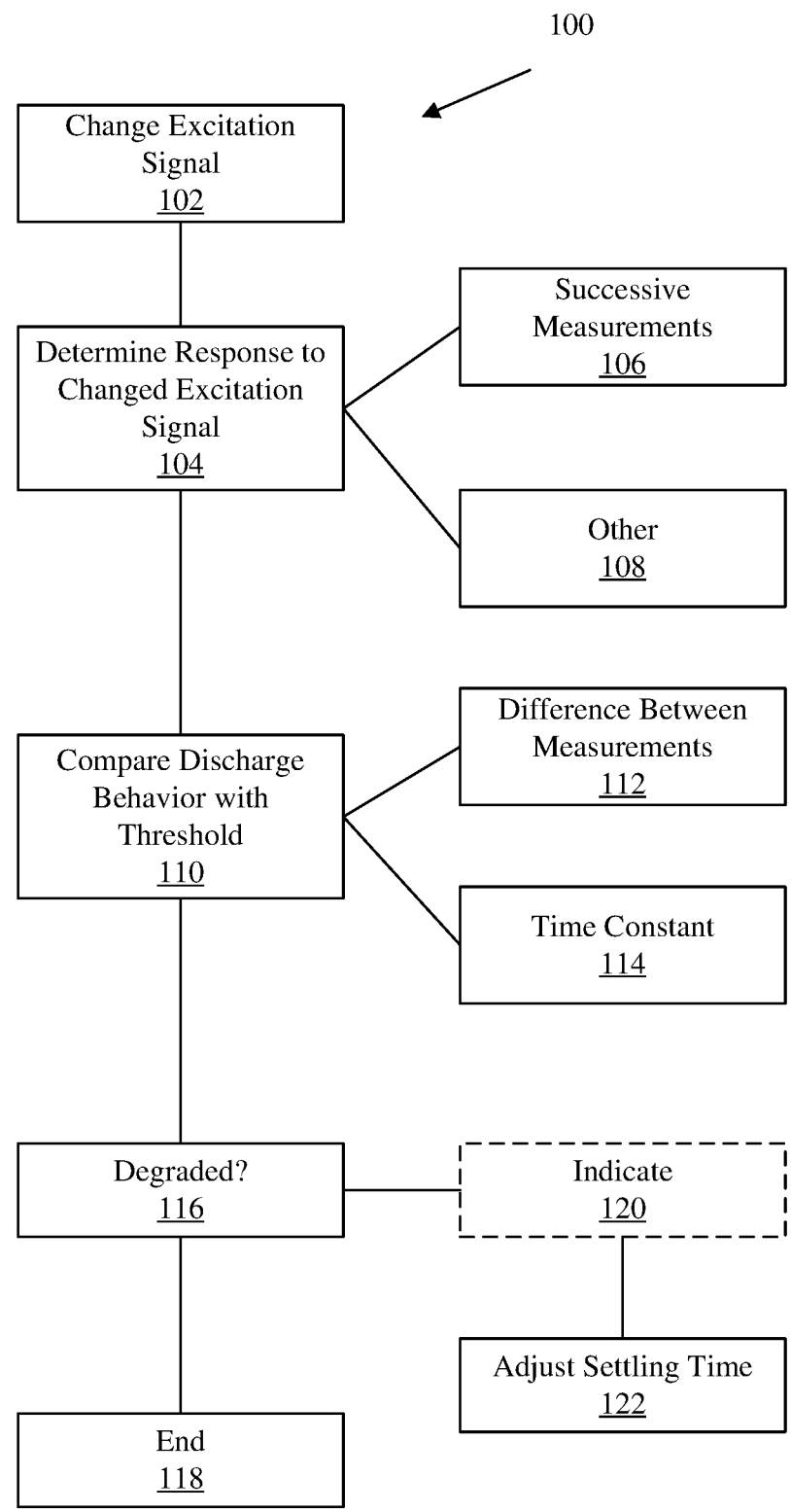
FIG. 6 is a flow diagram of a method of detecting and compensating for energy storage effects of an RTD assembly in accordance with an embodiment of the present invention.

FIG. 6 is a flow diagram of a method of detecting and compensating for high-temperature energy storage effects of an RTD assembly in accordance with an embodiment of the present invention. Method 100 begins at block 102 where a controller, such as controller 28 or another suitable device, removes an excitation current from an RTD assembly. Once the excitation current has been removed at block 102, the process temperature transmitter, or other suitable device, determines a voltage response of the RTD while there is zero excitation current, as indicated at block 104. This determined voltage response can be obtained by using a plurality of successive measurements, as indicated at block 106, and described above with respect to FIG. 5. However, block 104 can employ any suitable technique for determining the voltage response of the RTD, as illustrated at block 108. For example, the time required for the voltage response to fall to a suitably low voltage, such as zero, or some nominal voltage, can be measured. However, those skilled in the art will recognize that the voltage response can be determined in any number of suitable ways.

Next, at block 110, the discharge behavior of the RTD is compared with a threshold. One way in which this can be done is by comparing the difference between multiple successive measurements, as indicated at block 112. However, a time constant can be measured, or otherwise obtained, as indicated at block 114. Based on the discharge behavior comparison, block 116 determines if the RTD has suffered any degradation. If not, control passes to end block 118, where the diagnostic is completed. However, if degradation is detected, control passes to optional block 120, where an indication of such degradation may be provided. Such indication can be provided locally at a process fluid temperature transmitter, or communicated to a remote device, such as via process communication.

Next, at block 122, the settling time for the RTD is adjusted in order to accommodate the degradation. Such time adjustment can be set to ensure that a specified accuracy is continued to be provided by the process fluid temperature transmitter, such as less than or equal to an allowable error percentage. Additionally, in accordance with one embodiment, the adjusted settling time can be set to be only utilized when the process fluid temperature is at or above a selected temperature threshold. Thus, when the temperature returns to a lower value, the settling time can be restored to its shorter value in order to provide faster measurements. Since the time constant will increase with temperature, embodiments described herein can provide an indication that operation is nearing the limit of the specific RTD. Further, drift over time can also be evaluated as the RTD passes through particular temperature points that have been previously evaluated. The RTD response can be calculated, compared with a known good example or historical values, and an approximate health index can be determined and provided to the user as an indicator to replace the RTD. For example, if at time $T_1$, the discharge rate of the RTD is obtained at a temperature of 500° Celsius, and subsequently at time $T_2$, the discharge rate of the same RTD is obtained at the same temperature, a variation of the discharge rate can indicate wear or degradation of the RTD sensor.

Although the present invention has been described with reference to preferred embodiments, workers skilled in the art will recognize that changes may be made in form and detail without departing from the spirit and scope of the invention. For example, while the excitation source, measurement device and controller are described as separate devices, it is expressly contemplated that all of these functions could be embodied within a single microcontroller or application specific integrated circuit (ASIC).

What is claimed is:

1. A process fluid temperature transmitter comprising:
   a plurality of terminals couplable to a resistance temperature device (RTD), the RTD having a resistance that varies with process fluid temperature, the RTD being constructed from at least one material that develops an energy storage characteristic at elevated temperature, the energy storage characteristic causing an error in the process fluid temperature measurement;
   an excitation source operably coupled to the plurality of terminals and configured to apply an excitation signal to the RTD;
   a measurement device coupled to the plurality of terminals, the measurement device being configured to measure a response of the RTD to the applied excitation signal; and
   a controller coupled to the excitation source and the measurement device, the controller being configured to perform an RID resistance measurement by applying the excitation signal to the RTD and to cause the measurement device to measure the response of the RTD while the excitation signal is applied to the RTD, the controller also being configured to perform an RTD energy storage diagnostic by causing the excitation source to cease the excitation signal and causing the measurement device to measure an RTD electrical discharge time constant in response to the ceased excitation signal wherein the measured RTD electrical discharge time is indicative of the energy storage characteristic of the at least one material of the RTD.

2. The process fluid temperature transmitter of claim 1, wherein the controller is configured to determine RTD degradation based on the measurement obtained while the ceased excitation signal is applied to the RTD.

3. The process fluid temperature transmitter of claim 2, wherein the controller is configured to determine RTD degradation based on a difference between a plurality of successive voltage measurements obtained while no excitation current flows.

4. The process fluid temperature transmitter of claim 3, wherein the controller is configured to provide an indication of RTD degradation.

5. The process fluid temperature transmitter of claim 4, and further comprising communication circuitry coupled to the controller, wherein the communication circuitry is configured to provide a process fluid temperature output and the indication of RTD degradation.

6. The process fluid temperature transmitter of claim 1, wherein the excitation source is a current source and wherein the measurement device is a voltage measurement device.

7. The process fluid temperature transmitter of claim 6, wherein the controller is configured to change a voltage measurement parameter based on the determined RT) electrical discharge time constant.

8. The process fluid temperature transmitter of claim 7, wherein the voltage measurement parameter is settling time.

9. The process fluid temperature transmitter of claim 7, wherein the controller is configured to increase the settling time to achieve a selected measurement accuracy.

10. The process fluid temperature transmitter of claim 9, wherein the selected measurement accuracy is 1%.

11. The process fluid temperature transmitter of claim 9, wherein the increased settling time is used for temperature measurements in a first temperature range, and an original settling time is used for temperature measurements in a second temperature range lower than the first temperature range.

12. The process fluid temperature transmitter of claim 9, wherein a subsequent process temperature output is obtained using the increased settling time.

13. A process fluid temperature transmitter comprising:
a resistance temperature device (RTD) having a temperature sensitive element and at least one electrically isolating structure disposed proximate the temperature sensitive element, the at least one electrically isolating element having an energy storage characteristic at an elevated temperature within a thermal operating range of the RTD;
an excitation source operably coupled to the RTD and configured to apply an excitation signal to the RTD;
a measurement device coupled to the RTD, the measurement device being configured to measure a response of the RTD to the excitation signal; and
a controller coupled to the excitation source and the measurement device, the controller being configured to perform an RTD resistance measurement by causing the excitation source to apply the excitation signal to the RTD and to cause the measurement device to measure a response of the RTD to the excitation signal while the excitation signal is applied to the RTD, the controller also being configured to perform an RTD energy storage diagnostic by causing the excitation source to cease the excitation signal and causing the measurement device to measure an electrical energy discharge response of the RTD to the ceased excitation signal, wherein the measured electrical energy discharge response is indicative of the energy storage characteristic of the at least one electrically isolating structure of the RTD.

14. The process fluid temperature transmitter of claim 13, wherein the temperature sensitive element is formed of at least one coil of platinum wire disposed within a ceramic body.

15. The process fluid temperature transmitter of claim 14, wherein the temperature sensitive element is formed of a plurality of coils of platinum wire coupled in series by an interconnect disposed at a first end of an RTD assembly and being sealed therein.

16. The process fluid temperature transmitter of claim 15, wherein the first end of the RTD assembly and a second end of the RTD assembly are sealed with glass.

17. The process fluid temperature transmitter of claim 15, wherein the first end of the RTD assembly and a second end of the RTD assembly are sealed with cement.

18. The process fluid temperature transmitter of claim 13, wherein the excitation source is a current source and wherein the measurement device is a voltage measurement device.

* * * * *